(12) United States Patent
Shin et al.

(10) Patent No.: US 6,396,543 B1
(45) Date of Patent: May 28, 2002

(54) DEINTERLACING APPARATUS OF DIGITAL IMAGE DATA

(75) Inventors: Chang Yong Shin; Dong Il Han, both of Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/475,257

(22) Filed: Dec. 30, 1999

(30) Foreign Application Priority Data

Dec. 31, 1998 (KR) .......................................... 98-62889

(51) Int. Cl.$^7$ ................................................. H04N 7/01
(52) U.S. Cl. ....................................... 348/452; 348/448
(58) Field of Search ................................. 348/452, 448, 348/458, 607, 625, 618

(56) References Cited

U.S. PATENT DOCUMENTS

| | | | |
|---|---|---|---|
| 4,947,251 A | * | 8/1990 | Hentschel .................. 358/166 |
| 5,027,201 A | | 6/1991 | Bernard |
| 5,159,451 A | | 10/1992 | Faroudja et al. |
| 5,410,356 A | * | 4/1995 | Kikuchi et al. ............. 348/452 |
| 5,519,451 A | * | 5/1996 | Clatanoff et al. .......... 348/606 |
| 5,631,706 A | * | 5/1997 | Tsunashima ................ 348/452 |
| 5,917,554 A | * | 6/1999 | Ohta .......................... 348/581 |
| 6,034,734 A | * | 3/2000 | De Haan et al. ........... 348/458 |
| 6,181,382 B1 | * | 1/2001 | Kieu et al. .................. 348/459 |
| 6,259,480 B1 | * | 7/2001 | Yamauchi et al. .......... 348/452 |

* cited by examiner

*Primary Examiner*—Victor R. Kostak
(74) *Attorney, Agent, or Firm*—Birch, Stewart, Kolasch & Birch, LLP

(57) ABSTRACT

A deinterlacing method and apparatus for digital image data is disclosed. In the present invention, one of various interpolations appropriately performed according to a detected extent and direction of motion in a pixel to be interpolated. Thus, a screen quality can significantly be improved.

20 Claims, 6 Drawing Sheets

DEINTERLACING APPARATUS OF DIGITAL IMAGE DATA

BACKGROUND OF THE INVENTION

1. Field of the Invention

The present invention relates to digital images and more particularly to a deinterlacing apparatus of digital image data by obtaining motion information and executing interpolations according to the motion information.

2. Discussion of Related Art

Generally, a picture of a digital TV may be displayed on a monitor by interlaced scanning or progressive scanning. Some display monitors require one type of scanning pattern while the image is received in the other type of scanning pattern. Therefore, a deinterlacing apparatus converts an interlaced field to a non-interlaced field (or progressive frame) data by filling pixel values of omitted field lines in the interlaced field.

Particularly, a digital TV supports a display of progressive frame data. As a result, if an interlaced field is received, the data must be converted into the progressive frame data. Typical methods used for converting the interlaced field into the progressive frame are an inter-field interpolation method which inserts data from a previous field between current field line data, without motion compensation, and a line doubling method which repeatedly uses field line data of a current field. There are other methods such as an intra-field interpolation method which uses a linear line interpolation of the current field.

FIG. 1A shows the line doubling method, FIG. 1B shows the inter-field interpolation method, and FIG. 1C shows the intra-field interpolation method. Such interpolation methods can be constructed by simple hardware, but may cause degradation to the image. Namely, in the line doubling method, the image quality of displayed video would generally be degraded after an interpolation. In the inter-field interpolation method without the motion compensation, the image quality of video portions with motion may considerably be degraded after an interpolation. In contrast, the image quality of video portions without motion may be degraded after interpolation by the intra-field interpolation method.

Accordingly, a method of detecting a motion and converting the interlaced field to a progressive frame has been proposed by Bernard in U.S. Pat. No. 5,027,201 and by Faroudja in U.S. Pat. No. 5,159,451. Although these methods improve the video quality after interpolation, a complicated hardware including a plurality of memories and a complicated processing are required. As a result, the overall cost of manufacturing a deinterlacing apparatus would increase, thereby increasing the cost of a digital TV.

SUMMARY OF THE INVENTION

Accordingly, an object of the present invention is to solve at least the problems and disadvantages of the related art.

An object of the present invention is to provide an efficient deinterlacing method and apparatus.

Another object of the present intention is to provide a deinterlacing method and apparatus for digital image data, which is capable of improving a quality of the displayed video.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a deinterlacing apparatus includes a BD & BPPD detecting unit for calculating a brightness profile pattern difference and a brightness difference between a current field and a previous field data; a BD & BPPD combiner for respectively limiting the obtained BD and the BPPD by a threshold value, mapping the BD and BPPD to preset levels, and deciding an extent of motion present according to its magnitude; a median filter for eliminating a noise component of the extent of motion value output by the BD & BPPD combiner, and grouping portions with motion; a motion extender for extending an effect of a motion to adjacent pixels; and an edge detector for detecting an edge direction for a pixel to be interpolated in a current field, detecting a characteristic of a local correlation in the vertical direction, and providing additional information necessary for a detection of intra-field motion information and a calculation of intra-field motion extent.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Generally, a deinterlacing apparatus in which pixels are interpolated according to a detected extent of motion is disclosed in copending application Ser. No. 09/224,049 entitled "Deinterlacing Device and Method for Digital TV receiver," and is fully incorporated herein. In the deinterlacing method and apparatus according to the present invention, motion information is detected and an appropriate interpolation is performed according to both an extent of motion and a direction of the motion.

Particularly, the present deinterlacing apparatus includes an edge detector which detects a edge direction of an object around pixels to be interpolated and calculates an interpolation value according to the detected direction. The edge direction of an object is a direction toward which an object may be present within a data block of a field line to be interpolated. For example, if a diagonal bar is present from the bottom left corner to the top right corner, the edge direction would be in the 45 degree line.

Figure 3:
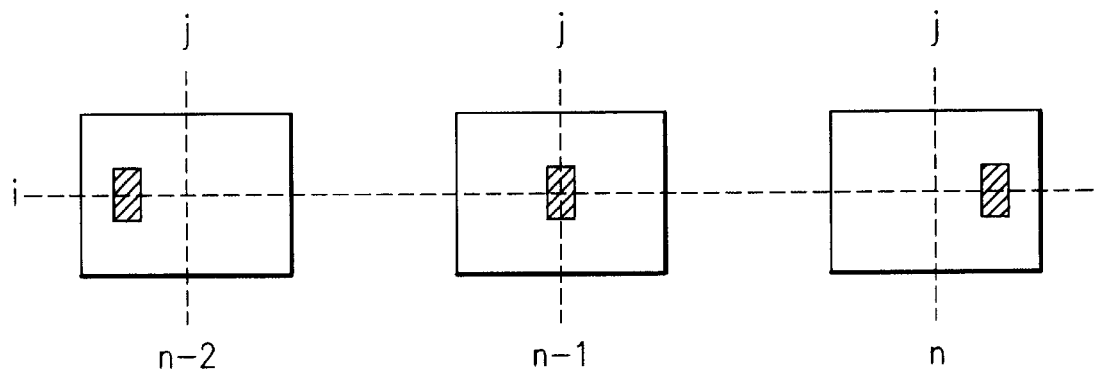
FIG. 3 shows a method of detecting a locally vertical correlation in accordance with the present invention.

The edge detector may also extract a local correlation around the pixel to be interpolated. For example, if an object moves rapidly as shown in FIG. 3, a BD and BPPD values between two interlaced fields n and (n−2) around coordinates (i,j) would be '0.' Thus, the video portion for n to (n−2) would be regarded as a portion without motion. To prevent an incorrect detection of motion, a local correlation is obtained to more accurately interpolate the pixels.

Figure 1A:
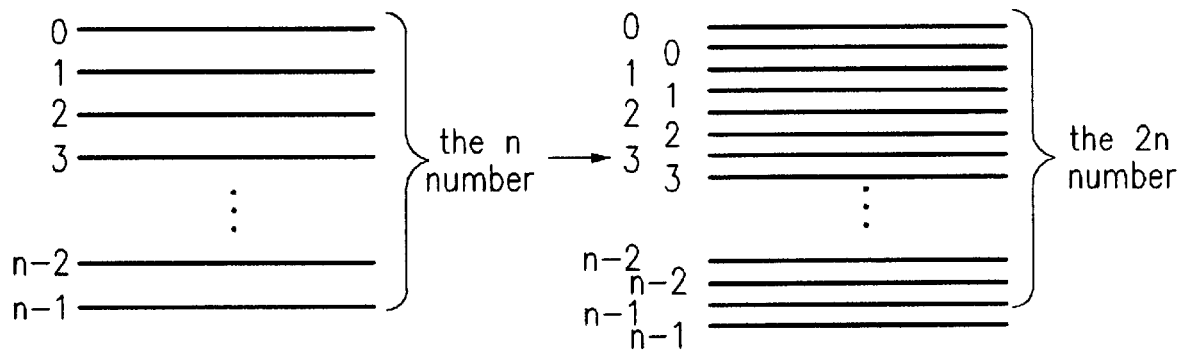
FIGS. 1A to 1C show methods of interpolating digital image data in the related art.
Figure 1B:
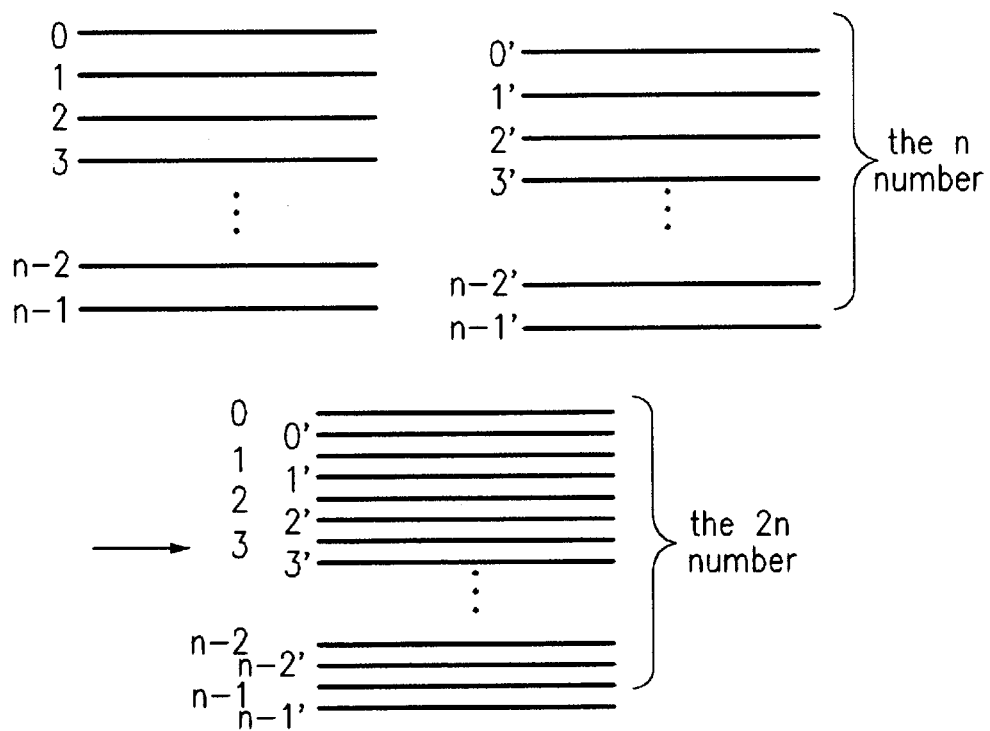
Figure 1C:
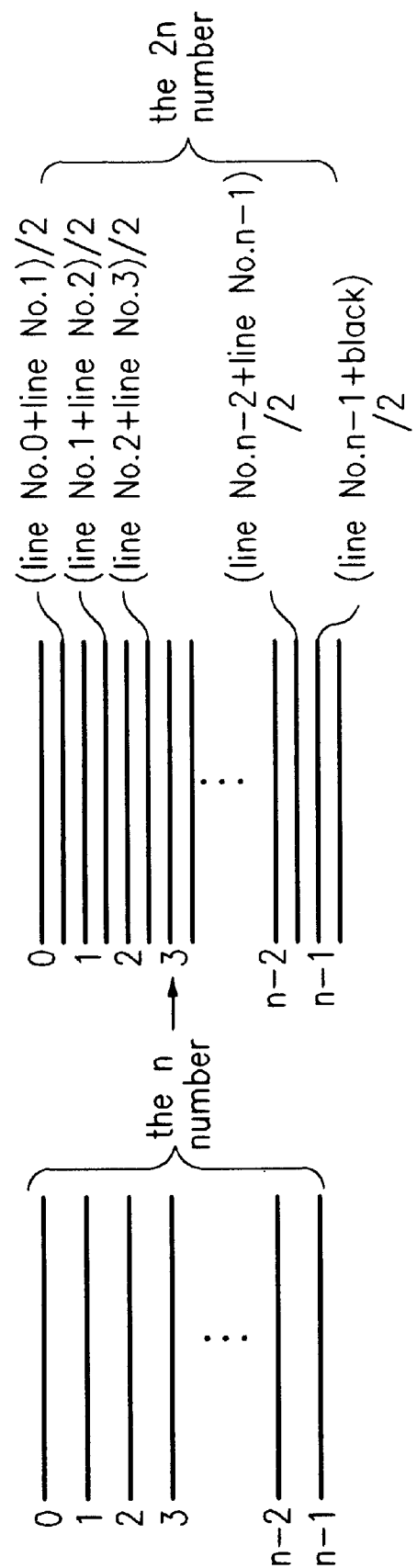
Figure 2:
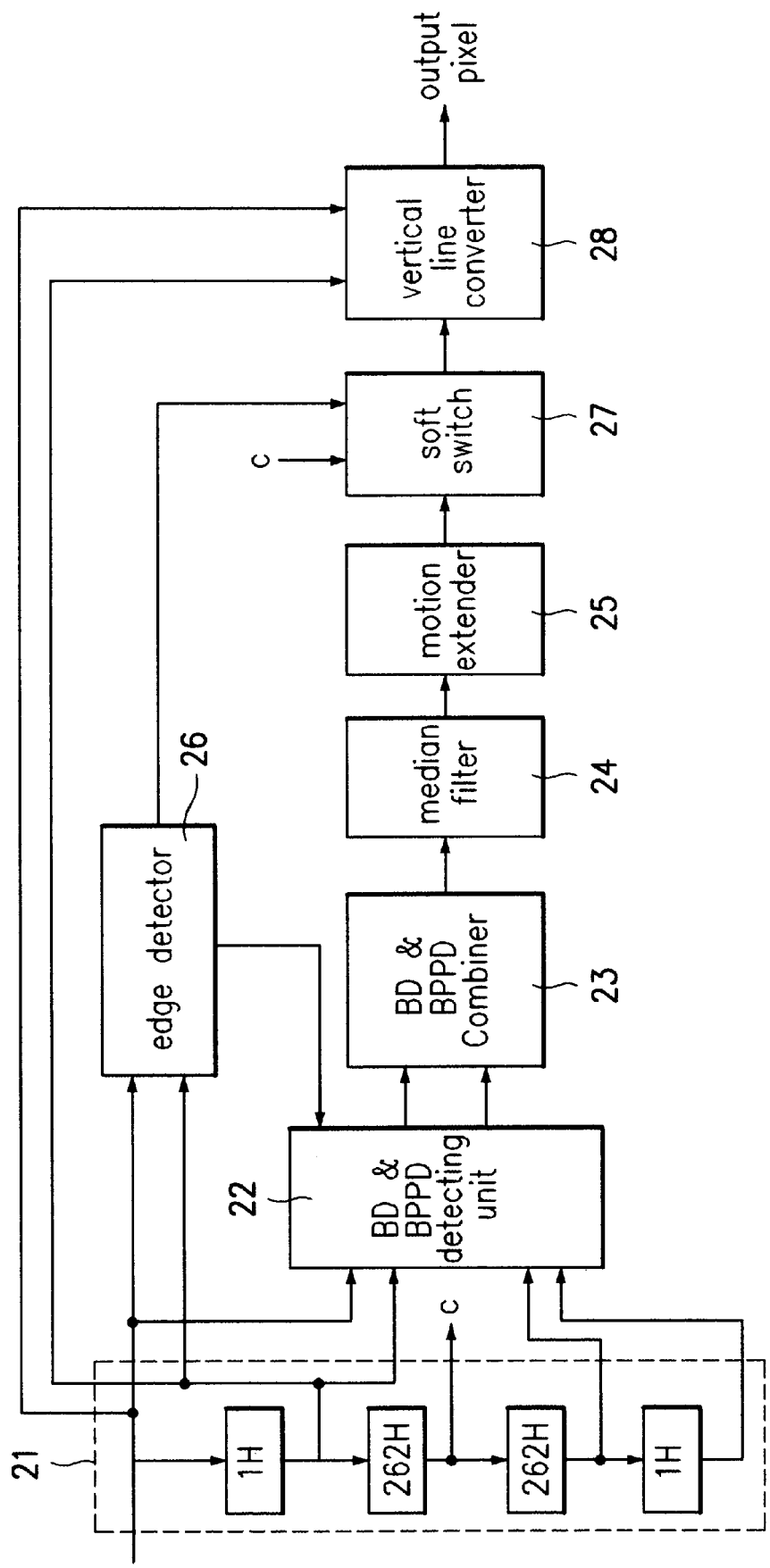
FIG. 2 is a block diagram of a deinterlacing apparatus in accordance with the present invention.

Therefore, the edge detector generates information to calculate BD and BPPD values necessary to calculate an intra-field motion information. FIG. 2 is a block diagram of a deinterlacing apparatus according to the present invention including a field data storage unit 21 which stores three fields, namely a current interlaced field n and two previous interlaced fields (n−1) and (n−2); a BD & BPPD detecting unit 22 which calculates a brightness profile pattern difference (BPPD) value and a brightness difference (BD) value between the current interlaced field and the previous interlaced field (n−2) in order to determine a presence and an extent of motion; a BD & BPPD combiner 23 which respectively limits the BD and BPPD values by a threshold value, maps the limited BD and BPPD values to preset levels, compares the magnitudes and decides the presence and extent of the motion; a median filter 24 which eliminates a noise component in the detected motion, and groups portions having the motion; a motion extender 25 which extends an effect of the motion to adjacent pixels; an edge detector 26 which detects an edge direction around a pixel to be interpolated; a soft switch 27 which mixes an output value of the edge detector 26 and a value (c) of the previous interlaced field (n−1) from the same position as that of a pixel to be interpolated, and outputs the mixed value to appropriately interpolate pixel values; and a vertical line converter 28 which converts the number of vertical lines to conform with a required display format, by using data of the current field and interpolation line data from the soft switch 27, and outputs a non-interlaced field.

Figure 4:
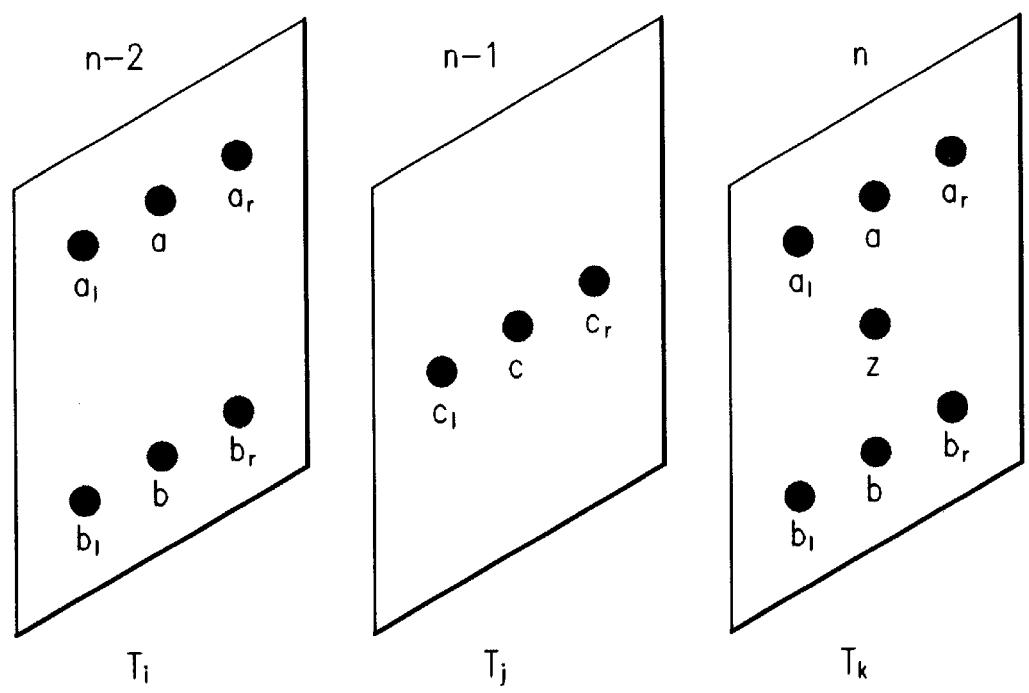
FIG. 4 shows a constructive diagram for three consecutive field data used in the deinterlacing apparatus of FIG. 2.

The operation of the present deinterlacing apparatus will be explained below with reference to FIG. 3 which show a method of detecting a local correlation and FIG. 4 which sets a diagram for three consecutive field data, where n is a current interlaced field, and (n−1) and (n−2) are previous interlaced fields. First, the edge direction detection to determine an appropriate interpolation of a pixel will be explained with reference to Table 1 below.

TABLE 1

| ith L line to interpolate | 0 | 1 | ... | j−2 | j−1 | j<br>A | j+1 | j+2 | ... | L−2 | L−1 |
|---|---|---|---|---|---|---|---|---|---|---|---|
| i+1 L | 0 | 1 | | j−2 | j−1 | j | j+1 | j+2 | | L−2 | L−1 |

To determine the edge direction of a pixel A to be interpolated, the following calculation is executed where |*| represents an absolute value operation and Med(a, b, c) represents a median of a, b, c.

$$Med_{-45}=\{|P(i, j-2)-P(i+1, j)|, |P(i, j-1)-P(i+1, j+1)|, |P(i, j)-P(i+1, j+2)|\} \quad [1]$$

$$Med_{45}=\{|P(i, j)-P(i+1, j-2)|, |P(i, j+1)-P(i-1, j-1)|, |P(i, j+2)-P(i+1, j)|\} \quad [2]$$

$$Med_{0}=\{|P(i, j-1)-P(i+1, j-1)|, |P(i, j)-P(i+1, j)|, |P(i, j+1)-P(i+1, j+1)|\} \quad [3]$$

Equation [1] represents an edge in the −45 degree line direction, Equation [2] represents an edge in the 45 degree line direction, and Equation [3] represents an edge in the 0 degree line direction. For each direction, correlations of three pixels are obtained and a median of the three correlations is used to reduce an effect of noise contained in the input field image data.

The values obtained through Equations [1]–[3] are compared with a threshold value. At this time, mutually different threshold values may be applied according to the respective directions. However, a same threshold $E_{th}$ may be used in all directions, as shown below.

If $Med_{45}<E_{th}$, edge45°=0 else edge45°=$Med_{45}$ [4]

If $Med_{0}<E_{th}$, edge0°=0 else edge0°=$Med_{0}$ [5]

If $Med_{-45}<E_{th}$, edge-45°=0 else edge-45°=$Med_{-45}$ [6]

A final determination of a edge direction may be represented as follows, where Min{a,b,c} means the minimum value from a,b,c.

$$Min\{edge45°, edge0°, edge-45°\} \quad [7]$$

When values obtained in all directions are equivalent, the edge exists in the 0° direction and this may be represented as edge(0°). Similarly, if values obtained for 0 degree and 45 degree directions are equivalent, the edges exist in the directions of 45 degree and 0 degree, which are represented as edge(45° and 0°). The possible cases are shown in Table 2, where $\alpha<\beta$ and l*m*n.

TABLE 2

| edge 45° | edge 0° | edge − 45° | [7] |
|---|---|---|---|
| α | α | α | edge (0°) |
| α | α | β | edge (45°, 0°) |
| α | β | α | edge (0°) |
| β | α | α | edge (0°, −45°) |
| l | m | n | direction of minimum value |

The pixel A would be interpolated as shown in Table 3, according to the detected edge direction in the edge detector for the intra-field interpolation.

TABLE 3

| edge direction | interpolation pixel value |
|---|---|
| edge − 45°, 0° | (P(i, j − 1) + P(i + 1, j + 1) + P(i, j) + P(i + 1, j))/4 |
| edge 0°, 45° | (P(i, j) + P(i + 1, j) + P(i, j + 1) + P(i + 1, j − 1))/4 |
| edge 0° | (P(i, j) + P(i + 1, j))/2 |
| edge − 45° | (P(i, j − 1) + P(i + 1, j + 1))/2 |
| edge 45° | (P(i, j + 1) + P(i + 1, j − 1))/2 |

It should be noted that the pixel interpolation was decided in consideration of five pixels per line, but can be extended to N number of pixels. Also, only three edge directions were detected in the above embodiment, but more or less edge directions may be detected depending upon the required accuracy. By maintaining a characteristic of an image near an edge through the interpolation pixel value decision as described above, an overall video quality after an interpolation can be significantly improved.

Thereafter, a local correlation may be detected. As shown in FIG. 3, when an object moves rapidly, the BD and BPPD values between a current interlaced field n and a previous interlaced field (n−2) for pixels adjacent the coordinate (i,j) would be '0'. Thus, the pixels near coordinate (i,j) of the current field n to be interpolated would be interpolated by pixel values of the previous field (n−1). However, a moving object exists on the coordinate (i,j) of the field n as shown in FIG. 3, which would cause a mistake in the interpolation.

Accordingly, a local correlation in the vertical direction can further be detected to catch rapidly moving objects, thereby allowing a more accurate interpolation. Generally, an object moves in a shape of a lump. In the detection of the local correlation, a line i immediately above and a line i+1 immediately below a line to be interpolated are used. The local correlation is detected using pixels observed around the pixel A to be interpolated. Particularly, three methods can be considered in obtaining the local correlation in the vertical direction $V_{cor}$ depending upon the accuracy required.

In the first method,
if $$Med\{|P(i, j-1)-P(i+1, j-1)|, |P(i, j)-P(i+1, j)|, |P(i, j+1)-P(i+1, j+1)|\}<V_{th},$$

$V_{cor}=1$ else $V_{cor}=0$.

In a second method,
if $$|Med\{P(i, j-1), P(i, j), P(i, j+1)\}-Med\{P(i-1, j-1), P(i+1, j), P(i+1, j+1)\}|<V_{th},$$

$V_{cor}=1$ else $V_{cor}=0$.

In a third method, i) if $$|Med\{P(i, j-2), P(i, j-1), P(i, j)\}-Med\{P(i, j), P(i, j+1), P(i, j+2)\}|<H_{th},$$

$Hedge_1=0$ else $Hedge_1=1$;

ii) if $$|Med\{P(i+1, j-2), P(i+1, j-1), P(i+1, j)\}-Med\{P(i+1, j), P(i+1, j+1), P(i+1, j+2)\}|<H_{th},$$

$Hedge_2=0$ else $Hedge_2=1$;

iii) if $$|Med\{P(i, j-1), P(i, j), P(i, j+1)\}-Med\{P(i+1, j-1), P(i+1, j), P(i+1, j+1)\}|<V_{th},$$

$Vedge=0$ else $Vedge=1$.

In the third method, the local correlation in the vertical direction $V_{cor}$ is decided according to Table 4, after executing i), ii) and iii).

TABLE 4

| Hedge$_1$ | Hedge$_2$ | Vedge | Vcor |
|---|---|---|---|
| 0 | 0 | 0 | 1 |
| 0 | 0 | 1 | 0 |
| 0 | 1 | Don't care | 0 |
| 1 | 0 | Don't care | 0 |
| 1 | 1 | 0 | 1 |
| 1 | 1 | 1 | 0 |

The result entered in Table 4 may also be represented by the following Boolean algebra equation.

$$Vcor=NOT(Hedge_1 \ XOR \ Hedge_2 \ OR \ Vedge) \quad [8]$$

In the above three methods, $V_{th}$ indicates a vertical direction threshold and $H_{th}$ represents a horizontal direction threshold. Also, a $V_{cor}$ value of '0' indicates that there is no local correlation in the vertical direction, and thus the extent of motion is measured without utilizing a correlation as in the co-pending application Ser. No. 09/224,049. In contrast, a $V_{cor}$ value of '1' means that there is a local correlation in the vertical direction, and the motion extent is measured according to the following process with reference to FIG. 4.

First, the values $BPPD_a^{jk}$, $BPPD_b^{jk}$; $BD_a^{jk}$, $BD_b^{jk}$ are obtained also as disclosed in co-pending application Ser. No. 09/244,049.

Second, the values $BPPD_a^{jk}$, $BPPD_b^{jk}$; $BD_a^{jk}$, $BD_b^{jk}$ are obtained as follows:

$$BPPD_a^{jk}=|BPP_{cl}^j-BPP_{a1}^k|+|BPP_{cr}^j-BPP_{ar}^k|; \quad [9]$$

$$BPPD_b^{jk}=|BPP_{cl}^j-BPP_{b1}^k|+|BPP_{cr}^j-BPP_{br}^k|; \quad [10]$$

$$BD_a^{jk}=|B_c^j-B_a^k|; \quad [11]$$

$$BD_b^{jk}=|B_c^j-B_c^k|; \quad [12]$$

where, $$BPP_{cl}^j=B_c^j-B_{cl}^j; \quad [13]$$

$$BPP_{cr}^j=B_c^j-B_{cr}^j. \quad [14]$$

To prevent a degradation in the resolution of an overall video due to a misjudgement of the motion presence, the local correlation in the vertical direction is used as additional information to determine a presence and extent of motion.

This may be performed through the following equation.

$$BPPD_{min}^{jk}=min\{BPPD_a^{jk}, BPPD_b^{jk}\} \quad [15]$$

$$BD_{min}^{jk}=min\{BD_a^{jk}, BD_b^{jk}\} \quad [16]$$

$$BPPD=max\{BPPD_a^{jk}, BPPD_b^{jk}, BPPD_{min}^{jk}\} \quad [17]$$

$$BD=max\{BD_a^{jk}, BD_b^{jk}, BD_{min}^{jk}\} \quad [18]$$

Namely, a presence and extent of motion is re-determined using the local correlation information. Such operation prevents problems caused by incorrect interpolation due to an existence of an object moving on the neighborhood of the coordinates of nth field shown in FIG. 3.

Figure 5:
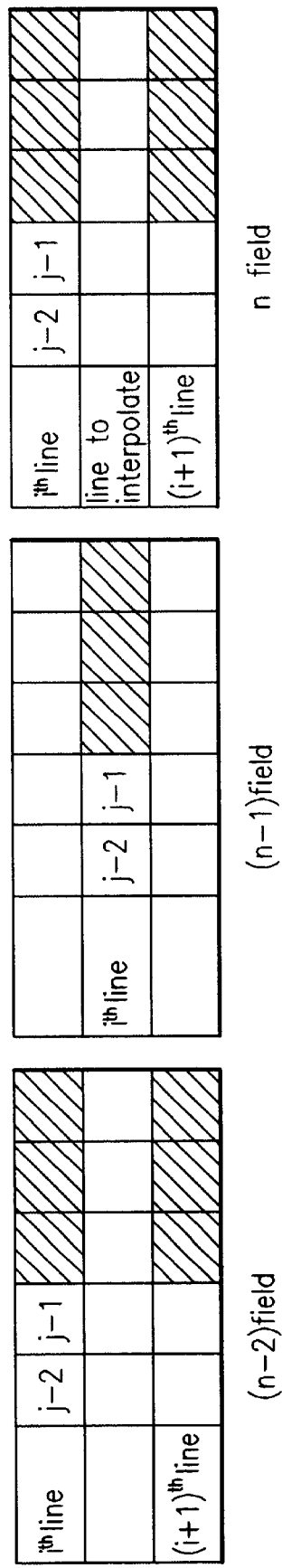
FIGS. 5 and 6 show examples of input interlaced fields.
Figure 6:
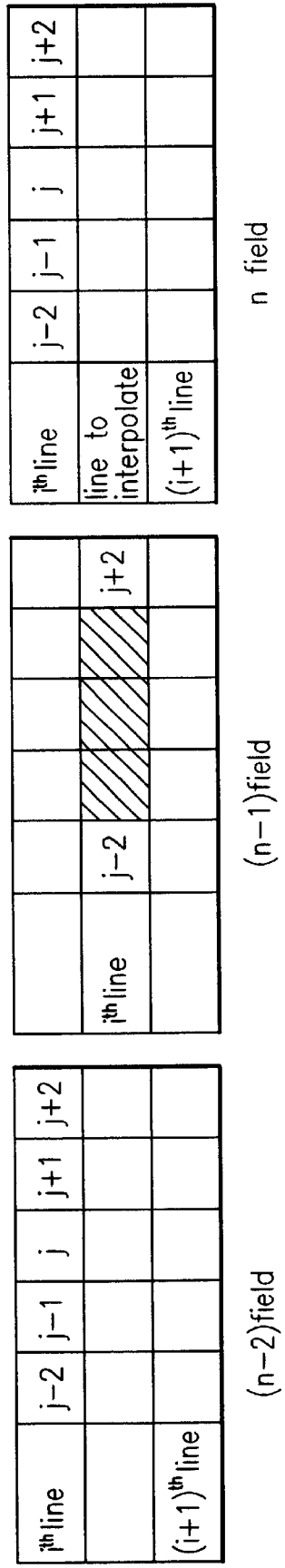

For example, FIGS. 5 and 6 each show a portion of input data for three interlaced fields. If the pixels of previous fields (n−1) and (n−2) around the pixel position to be interpolated in field n appears as in FIG. 5, the local correlation in the vertical direction $V_{cor}$=1, but Equations [17] and [18] results in values of '0', indicating that there is actually no motion. In contrast, if the pixels of previous fields (n−1) and (n−2) around the pixel position to be interpolated in field n appears as in FIG. 6, $V_{cor}$=1 and Equations [17] and [18] would result in a non-zero value, indicating that there is motion. Therefore, a band limitation is appropriately executed so as not to cause a serious intra-field line flicker phenomenon when an original image enters the interlace field.

Namely, if pixels in lines i and (i+1) of the current interlaced nth field have a local correlation for a still image, i.e. portion without motion, pixels in line i of a previous (n−1)th field would also have the local correlation detected for pixels in lines i and i+1 of the nth field. Such operation is executed and judged through Equations [15]–[18].

In the preferred embodiment, both the edge direction and local correlations are used in converting an interlaced field into a non-interlaced field for a progressive scanning. Moreover, in obtaining the local correlation, the second method requires more operations than the first method, and the third method require more operations than the second method. Namely, more operations means more calculation, but also more accuracy. Therefore, the method for obtaining the local correlation may be selected based upon the needs of the system.

In accordance with the present invention, a deinterlacing apparatus of digital image data has the following effects. An overall screen quality after an interpolation can be improved by maintaining an edge characteristic of an interpolation pixel. In addition, an interlaced field is converted into a progressive field by considering a vertical correlation of observed objects, thereby further improving an overall screen quality. Finally, the structure of the format conversion circuit is simplified to reduce an overall manufacturing expense.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A deinterlacing apparatus comprising:
   a field data storage unit which stores field data;
   a BD & BPPD detecting unit which calculates a brightness profile pattern difference (BPPD) value and a brightness difference (BD) value between a current interlaced field n and a previous interlaced field (n−2);
   a combiner which respectively limits the BD and BPPD values by a threshold value, maps the limited BD and BPPD values to preset levels, compares the magnitudes and decides a presence and extent of motion to output detected motion;
   a motion extender which extends an effect of the detected motion to pixels adjacent to a pixel to be interpolated;
   an edge detector which detects an edge direction around a pixel to be interpolated; and
   a interpolation unit which interpolates a pixel according to the output of the edge detector and the output of the motion extender, and outputs a non-interlaced field.

2. An apparatus of claim 1, wherein said edge detector detects an edge direction using the following equations:

$$Med_{-45} = \{|P(i, j-2)-P(i+1, j)|, |P(i, j-1)-P(i+1, j+1)|, |P(i, j)-P(i+1, j+2)|\}$$

$$Med_{45} = \{|P(i, j)-P(i+1, j-2)|, |P(i, j+1)-P(i+1, j-1)|, |P(i, j+2)-P(i+1, j)|\}$$

$$Med_0 = \{|P(i, j-1)-P(i+1, j-1)|, |P(i, j)-P(i+1, j)|, |P(i, j-1)-P(i+1, j+1)|\}$$

where $Med_{45}$ indicates a edge direction in a 45 degree line, $Med_0$ indicates a edge direction in a 0 degree line, $Med_{-45}$ indicates a edge direction in a −45 degree line, i indicates a line above a line to be interpolated in the current interlaced field, i+1 indicates a line below the line to be interpolated in the current interlaced field and j indicates a pixel position within a line.

3. An apparatus of claim 2, wherein the value of $Med_{45}$, $Med_0$, and $Med_{-45}$ are each compared with either an identical threshold value or respectively compared with three different threshold values, and an edge direction is determined to be present in at least one direction corresponding to the values $Med_{45}$, $Med_0$, and $Med_{-45}$ depending upon the comparison.

4. An apparatus of claim 2, wherein the values of $Med_{45}$, $Med_0$, and $Med_{-45}$ are each compared to a threshold value $E_{th}$ as follows:
   If $Med_{45} < E_{th}$, edge45°=0 else edge45°=$Med_{45}$
   If $Med_0 < E_{th}$, edge0°=0 else edge0°=$Med_0$
   If $Med_{-45} < E_{th}$, edge−45°=0 else edge−45°=$Med_{-45}$
and a edge direction corresponding to a minimum value among edge45°, edge0°, edge−45° is determined to be present.

5. An apparatus of claim 4, wherein the edge direction is determined according to the following table where $\alpha < \beta$ and l*m*n,

| edge 45° | edge 0° | edge − 45° | edge direction |
|---|---|---|---|
| α | α | α | edge (0°) |
| α | α | β | edge (45°, 0°) |
| α | β | α | edge (0°) |
| β | α | α | edge (0°, −45°) |
| l | m | n | direction of minimum value |

6. An apparatus of claim 4, wherein a pixel is interpolated according to the following table,

| edge direction | interpolation pixel value |
|---|---|
| edge − 45°, 0° | (P(i, j − 1) + P(i + 1, j + 1) + P(i, j) +P(i + 1, j))/4 |
| edge (0°,45°) | (P(i, j) + P(i + 1, j) + P(i, j + 1) + P(i + 1, j − 1))/4 |
| edge 0° | (P(i, j) + P(i + 1, j))/2 |
| edge − 45° | (P(i, j − 1) + P(i + 1, j + 1))/2 |
| edge 45° | (P(i, j − 1) + P(i + 1, j − 1))/2 |

7. An apparatus of claim 1, wherein said edge detector also obtains a local correlation around a pixel to be interpolated.

8. An apparatus of claim 7, wherein the local correlation is obtained using one of three methods below, where $V_{th}$ indicates a vertical direction threshold, $H_{th}$ represents a horizontal direction threshold, and $V_{cor}=0$ indicates a local correlation in a vertical direction:

(1) $V_{cor}=1$ if
   Med{|P(i, j−1)−P(i+1, j−1)|, |P(i, j)−P(i+1, j)|, |P(i, j+1)−P(i+1, j+1)}<$V_{th}$;

(2) $V_{cor}=1$ if
   |Med{P(i, j−1), P(i, j), P(i, j+1)}−Med{P(i+1, j−1), P(i+1, j), P(i+1, j+1)}|<$V_{th}$; or (3)
   i) Hedge$_1$=0 if
      |Med{P(i, j−2), P(i, j−1), P(i, j)}−Med{P(i, j), P(i, j+1), P(i, j+2)}|<$H_{th}$,
   ii) Hedge$_2$=0 if
      Med{P(i+1, j−2), P(i+1, j−1), P(i+1, j)}−Med{P(i+1, j), P(i+1, j+1), P(i+1, j+2)}|<$H_{th}$,
   iii) Vedge=0 if
      |Med{P(i, j−1), P(i, j), P(i, j+1)}−Med{P(i+1, j−1), P(i+1, j), P(i+1, j+1)}|<$V_{th}$,
where $V_{cor}$=NOT(Hedge$_1$ XOR Hedge$_2$ OR Vedge).

9. An apparatus of claim 1, wherein the interpolation unit comprises:
   a soft switch which mixes the output value of the edge detector and the output of the motion extender, and outputs the mixed value to appropriately interpolate a pixel value; and
   a vertical line converter which converts a number of vertical lines to conform with a required display format, by using data of the current interlaced field and interpolated pixels from the soft switch, and outputs a non-interlaced field.

10. An apparatus of claim 1, further comprising a median filter which eliminates a noise component in the motion detected by the combiner, groups portions with motion and outputs the result to the motion extender.

11. A method for deinterlacing digital image comprising:
(a) calculating a BPPD value and a BD value between a current interlaced field and a previous interlaced field;
(b) limiting the BD and BPPD values respectively by a threshold value, mapping the limited BD and BPPD values to preset levels, comparing the magnitudes and deciding a presence and extent of motion to output detected motion;
(c) extending an effect of the detected motion to pixels adjacent to a pixel to be interpolated;
(d) detecting an edge direction around the pixel to be interpolated; and
(e) interpolating the pixel according to an edge direction and a value from (c), and outputting a non-interlaced field.

12. A method of claim 11, wherein in (d), detecting an edge direction using the following equations:

$$Med_{-45}=\{|P(i, j-2)-P(i+1, j)|, |P(i, j-1)-P(i+1, j+1)|, P(i, j)-P(i+1, j+2)|\}$$

$$Med_{45}=\{|P(i, j)-P(i+1, j-2)|, |P(i, j+1)-P(i+1, j-1)|, |P(i, j+2)-P(i+1, j)|\}$$

$$Med_0=\{|P(i, j-1)-P(i+1, j-1)|, |P(i, j)-P(i+1, j)|, |P(i, j+1)-P(i+1, j+1)|\}$$

where $Med_{45}$ indicates a edge direction in a 45 degree line, $Med_0$ indicates a edge direction in a 0 degree line, $Med_{-45}$ indicates a edge direction in a -45 degree line, i indicates a line above a line to be interpolated in the current interlaced field, i+1 indicates a line below the line to be interpolated in the current interlaced field and j indicates a pixel position within a line.

13. A method of claim 12, wherein the value of $Med_{45}$, $Med_0$, and $Med_{-45}$ are each compared with either an identical threshold value or respectively compared with three different threshold values, and an edge direction is determined to be present in at least one direction corresponding to the values $Med_{45}$, $Med_0$, and $Med_{-45}$ depending upon the comparison.

14. A method of claim 12, wherein the values of $Med_{45}$, $Med_0$, and $Med_{-45}$ are each compared to a threshold value $E_{th}$ as follows:

If $Med_{45}<E_{th}$, edge45°=0 else edge45°=$Med_{45}$
If $Med_0<E_{th}$, edge0°=0 else edge0°=$Med_0$
If $Med_{-45}<E_{th}$, edge-45°=0 else edge-45°=$Med_{-45}$ and a edge direction corresponding to a minimum value among edge45°, edge0°, edge-45° is determined to be present.

15. A method of claim 14, wherein the edge direction is determined according to the following table where α<β and l*m*n,

| edge 45° | edge 0° | edge - 45° | edge direction |
|---|---|---|---|
| α | α | α | edge (0°) |
| α | α | β | edge (45°, 0°) |
| α | β | α | edge (0°) |
| β | α | α | edge (0°, -45°) |
| l | m | n | direction of minimum value |

16. A method of claim 14, wherein a pixel is interpolated according to the following table,

| edge direction | interpolation pixel value |
|---|---|
| edge (-45°, 0°) | (P(i, j - 1) + P(i + 1, j + 1) + P(i, j) + P(i + 1, j))/4 |
| edge (0°, 45°) | (P(i, j) + P(i + 1, j) + P(i, j + 1) + P(i + 1, j - 1))/4 |
| edge 0° | (P(i, j) + P(i + 1, j))/2 |
| edge - 45° | (P(i, j - 1) + P(i + 1, j + 1))/2 |
| edge 45° | (P(i, j + 1) + P(i - 1, j - 1))/2 |

17. A method of claim 11, wherein in (d) further obtaining a local correlation around a pixel to be interpolated and wherein in (e) interpolating according to the edge direction, a local correlation and the value from (c).

18. A method of claim 17, wherein the local correlation is obtained using one of three methods below, where $V_{th}$ indicates a vertical direction threshold, $H_{th}$ represent a horizontal direction threshold, and $V_{cor}=0$ indicates a local correlation in a vertical direction:

(1) $V_{cor}=1$ if
Med{|P(i, j-1)-P(i+1, j-1)|, |P(i, j)-P(i+1, j)|, |P(i, j+1)-P(i+1, j+1)|}<$V_{th}$;

(2) $V_{cor}=1$ if
|Med{P(i, j-1), P(i, j), P(i, j+1)}-Med{P(i+1, j-1), P(i+1, j), P(i+1, j+1)}|<$V_{th}$; or (3)
i) Hedge$_1$=0 if
|Med{P(i, j-2), P(i, j-1), P(i, j)}-Med{P(i, j), P(i, j+1), P(i, j+2)}|<$H_{th}$,
ii) Hedge$_2$=0 if
Med{P(i+1, j-2), P(i+1, j-1), P(i+1, j)}-Med{P(i+1, j), P(i+1, j+1), P(i+1, j+2)}|<$H_{th}$,
iii) Vedge=0 if
|Med{P(i, j-1), P(i, j), P(i, j+1)}-Med{P(i+1, j-1), P(i+1, j), P(i+1, j+1)}|<$V_{th}$, where $V_{cor}$=NOT(Hedge$_1$ XOR Hedge$_2$ OR Vedge).

19. A method of claim 11, wherein (e) comprises:
mixing the edge direction and the value from (c), and outputting the mixed value to appropriately interpolate a pixel value; and
converting a number of vertical lines to conform with a required display format, by using data of the current interlaced field and interpolated pixels from the soft switch, and outputting a non-interlaced field.

20. A method of claim 11, further comprising eliminating a noise component in the detected motion in (b) and grouping portions with motion.

* * * * *